(No Model.)
F. P. KERN.
PRUNING IMPLEMENT.
No. 483,928. Patented Oct. 4, 1892.
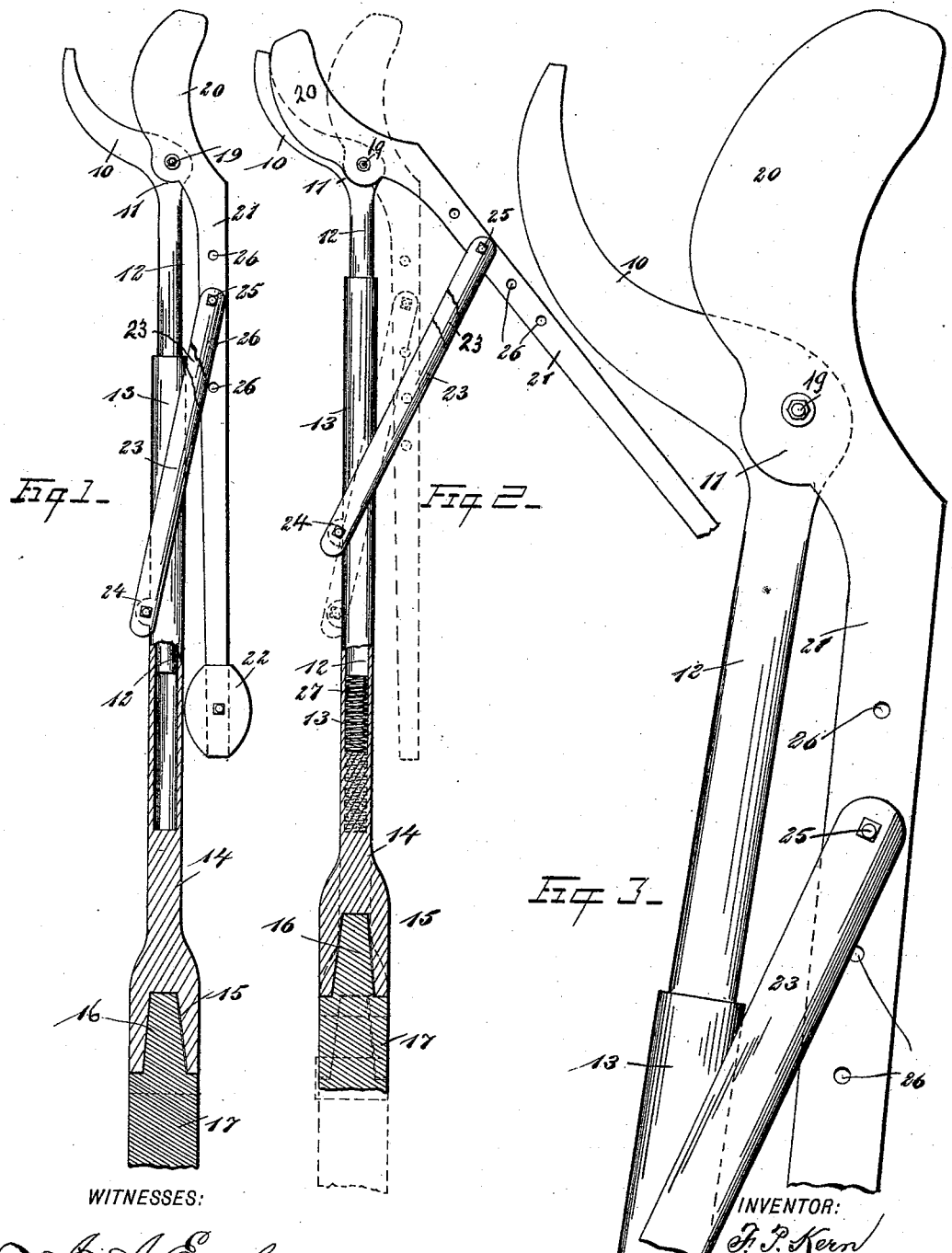
WITNESSES:
INVENTOR:
F. P. Kern
BY
Munn & Co
ATTORNEYS.

UNITED STATES PATENT OFFICE.

FRANK P. KERN, OF MISSOULA, MONTANA.

PRUNING IMPLEMENT.

SPECIFICATION forming part of Letters Patent No. 483,928, dated October 4, 1892.

Application filed February 19, 1892. Serial No. 422,124. (No model.)

*To all whom it may concern:*

Be it known that I, FRANK P. KERN, of Missoula, in the county of Missoula and State of Montana, have invented new and Improved Pruning-Shears, of which the following is a full, clear, and exact description.

My invention relates to improvements in pruning-shears such as are used for trimming trees, vines, &c.; and its object is to produce a cheap and simple implement of this kind which will not get out of order, which will work efficiently to cut off the limbs and twigs, which may be adjusted so as to give it any necessary power within reasonable limits, which will normally lie with the shear or cutting blade open ready for use, which is of small diameter, so that it may be easily thrust among the branches of a tree, and which is adapted to engage a limb in such a way that there will be no danger of splitting the limb when it is cut.

To this end my invention consists in pruning-shears, the construction of which will be hereinafter described and claimed.

Reference is to be had to the accompanying drawings, forming a part of this specification, in which similar figures of reference indicate corresponding parts in all the views.

Figure 1 is a broken side elevation, partly in section, of the shears embodying my invention, showing the blade in its normal or open position. Fig. 2 is a side elevation, partly in section, of a modified form of the implement, showing the shear or blade closed; and Fig. 3 is a broken enlarged detail view of the connected shear and hook, showing also the means of closing the shear.

The implement is provided with a hook 10, which is adapted to be pushed upward against the under side of a limb, and this hook has a knuckle 11 at its lower end, which merges in a straight shank 12, held to slide within a sleeve 13, which has a solid lower end 14, terminating in a socket 15, adapted to receive a tenon 16 on the upper end of a handle 17. The handle 17 may be of any desired length, according to the use to which the implement is to be put—that is to say, if it is to be used among shrubbery and small growth the handle is short, but if large trees are to be trimmed the handle is longer.

Pivoted to the knuckle of the hook, as shown at 19, is a shear or blade 20, having a convex cutting-edge adapted to move or slide over one side of the hook 10, and this shear or blade has a depending or straight shank 21, which carries at its free end a weight 22, and the weight will normally swing against the sleeve 13, so as to hold the shank 21 nearly parallel with the sleeve and with the hook-shank 12, and so as to hold the blade open, as shown in Fig. 1. The shank 21 is connected with the sleeve 13 by the connecting-rods 23, there being a rod on opposite sides of the sleeve, and the rods are pivoted to a lug 24 on the sleeve, and at their upper ends they are provided with a bolt 25, which extends through one of a series of holes 26 in the shank 21 of the blade or shear, and these connecting-rods provide for the closing of the blade, as described below. The object of having several holes 26 is to enable the connecting-rods to be secured to the shank at a greater or less distance from the shear or blade 20, so that a greater or less amount of power may be applied to the shear, as desired.

The operation of the implement is as follows: The operator pushes the implement up through the branches of the tree and presses with the hook 10 against the under side of the limb to be cut. The upward pressure on the handle causes the sleeve 13 to slide upward over the shank 12 of the hook, and the upward movement of the sleeve pushes upward and outward upon the connecting-rods 23, thus throwing out the shank 21, as shown in Fig. 2, and causing the shear or blade 20 to cut through the limb and down against one side of the hook 10, which serves as an abutment. When the limb is severed, the weight 22 causes the shank 21 to spring back to its place alongside of the sleeve 13 and hook-shank 12.

In Fig. 2 I have shown a spring 27 arranged within the lower part of the sleeve 13, and this spring serves as a substitute for the weight 22, as the pressure of the spring will normally throw the hook-shank 12 upward, and this will throw the cutting-blade open, as it will change the relative positions of the shanks 12 and 21.

Having thus described my invention, I claim as new and desire to secure by Letters Patent—

1. The pruning-shears comprising an upward-curved hook having a depending shank, a handle slidably mounted on the hook-shank, a shear pivoted at the base of the hook and adapted to close against one side of the same, the shear having a depending shank normally extending down alongside of the handle, means for holding the shear away from the hook to permit the entrance of the limb from above, and a connection between the shear-shank and the handle, substantially as described.

2. The pruning-shears comprising an open-topped hook having a depending straight shank, a sleeve held to slide on the hook-shank and adapted to be secured to a handle, a shear pivoted at the base of the hook and having a weighted shank, and connecting-rods pivoted to the sleeve and to the shear-shank, substantially as described.

FRANK P. KERN.

Witnesses:
J. J. GALBRAITH,
S. G. MURRAY.